(12) United States Patent
Dong et al.

(10) Patent No.: US 11,786,066 B2
(45) Date of Patent: Oct. 17, 2023

(54) KETTLE

(71) Applicant: TopNet, Inc., Los Angeles, CA (US)

(72) Inventors: Yuejun Dong, Zhejiang Province (CN); Yingli Yu, Zhejiang Province (CN)

(73) Assignee: TopNet Inc., Los Angeles, CA (US)

(*) Notice: Subject to any disclaimer, the term of this patent is extended or adjusted under 35 U.S.C. 154(b) by 109 days.

(21) Appl. No.: 16/566,243

(22) Filed: Sep. 10, 2019

(65) Prior Publication Data

US 2021/0068579 A1    Mar. 11, 2021

(51) Int. Cl.
*A47J 27/21* (2006.01)

(52) U.S. Cl.
CPC .............................. *A47J 27/21175* (2013.01)

(58) Field of Classification Search
CPC ................................................ A47J 27/21175
USPC .................. 222/23, 434, 472, 505; 219/438; 392/447
See application file for complete search history.

(56) References Cited

U.S. PATENT DOCUMENTS

| | | | | |
|---|---|---|---|---|
| 2,404,409 A * | 7/1946 | Smith | ................ | B65D 39/0023 215/352 |
| 2,701,659 A * | 2/1955 | Baltosser | ........... | B65D 51/1611 220/804 |
| 3,380,621 A * | 4/1968 | Rissberger, Jr. | ... | B65D 43/0212 220/203.1 |
| 3,513,292 A * | 5/1970 | Sano | ...................... | A47J 27/211 392/447 |
| 6,953,523 B2 * | 10/2005 | Vandenbelt | ............. | C02F 9/005 210/138 |
| 7,438,799 B2 * | 10/2008 | Vandenbelt | ............. | C02F 1/003 210/138 |
| 7,670,479 B2 * | 3/2010 | Arett | ....................... | C02F 1/003 210/474 |
| 7,987,770 B2 * | 8/2011 | Klump | .................... | C02F 1/003 206/181 |
| 8,961,781 B2 * | 2/2015 | Ma | ....................... | B01D 35/143 210/87 |
| 9,079,695 B1 * | 7/2015 | Bennett | .................. | B65D 53/00 |
| D815,482 S * | 4/2018 | Bell | .............................. | D7/318 |
| 9,937,446 B1 * | 4/2018 | McDonald | ............. | B65D 51/24 |
| 9,950,933 B1 * | 4/2018 | Rinker | ................... | A47G 19/12 |
| 10,125,027 B2 * | 11/2018 | Dani | .......................... | C02F 1/42 |
| 10,178,921 B1 * | 1/2019 | Rinker | ................... | B65D 51/24 |
| 10,343,931 B2 * | 7/2019 | Dani | .................... | B01D 29/114 |
| 2002/0179637 A1 * | 12/2002 | Doron | ..................... | B60P 3/226 222/108 |

(Continued)

FOREIGN PATENT DOCUMENTS

| | | |
|---|---|---|
| CN | 202027410 U | 9/2011 |
| CN | 104997354 A | 10/2015 |

(Continued)

*Primary Examiner* — Jimmy Chou

(57) ABSTRACT

A kettle includes a kettle body and a kettle lid. A water fill inlet is defined through the kettle lid and the kettle lid further comprises a water filling flap movably disposed below the water fill inlet for movement between a sealing position and an unsealing position with respect to the inlet. A closure mechanism is configured to apply a resilient drive force to bias the water filling flap toward its sealing position so as to enable the water filling flap to seal the water fill inlet. The water filling flap is configured to be moved toward its unsealing position to open the water fill inlet under the weight of water in the water fill inlet.

1 Claim, 3 Drawing Sheets

(56) References Cited

U.S. PATENT DOCUMENTS

| | | | | |
|---|---|---|---|---|
| 2006/0231476 A1* | 10/2006 | Vandenbelt | ............. | C02F 1/003 210/266 |
| 2008/0029504 A1* | 2/2008 | Labelle | ............... | A47J 41/0027 219/438 |
| 2010/0243682 A1* | 9/2010 | Yang | .................. | A47J 27/21175 222/469 |
| 2012/0018357 A1* | 1/2012 | Rajan | ................... | B01D 27/101 210/93 |
| 2012/0048787 A1* | 3/2012 | Rajan | ................... | B01D 27/101 210/85 |
| 2012/0145698 A1* | 6/2012 | Von Seidel | ....... | A47J 27/21016 219/438 |
| 2014/0083924 A1* | 3/2014 | Bergendal | .............. | C02F 1/003 210/451 |
| 2014/0251153 A1* | 9/2014 | Tien | ........................ | A47J 31/18 99/322 |
| 2015/0201771 A1* | 7/2015 | Elsaden | ............... | A47G 19/127 222/484 |
| 2016/0045056 A1* | 2/2016 | Kent | ..................... | H05B 6/804 219/731 |
| 2019/0345039 A1* | 11/2019 | Anderson | ............... | C02F 1/003 |

FOREIGN PATENT DOCUMENTS

| | | | | |
|---|---|---|---|---|
| EP | 2502530 A1 * | 9/2012 | ........ | A47J 27/21175 |
| GB | 11117 | 9/1908 | | |
| GB | 2327333 A * | 1/1999 | ........ | A47J 27/21175 |
| WO | WO-2005092155 A1 * | 10/2005 | ............. | A47G 19/12 |

\* cited by examiner

KETTLE

RELATED APPLICATIONS

None.

TECHNICAL FIELD

The disclosure herein relates generally to a kettle.

BACKGROUND

A conventional kettle has a kettle body and a kettle lid. Typically, the kettle lid is either disposed directly on the kettle body and covers it off or is connected via a shaft (e.g., axial pin) pivotally connected to the kettle body. In such case, if water is to be added to the kettle body, the kettle lid must be removed, or the kettle lid swiveled up to remove the kettle lid from the kettle body. For a user, it is inconvenient to refill water in such conventional kettles. Therefore, there is still room for improvement.

The above information disclosed in this section is provided only for the purpose of improving the understanding of the prerequisites for creating a true invention and therefore may include information that does not represent the state of the art that is known to those skilled in the art.

SUMMARY

In order to solve the existing problem of the prior art, it is an object of the present invention to provide a kettle in which water can be easily replenished without requiring a user to open the kettle lid.

Other aspects and advantages will be set forth in part in the description which follows, and in part will be obvious from the description, or may be learned by practice of the invention.

According to one aspect of the invention, a kettle has a kettle body and a kettle lid, wherein a water fill inlet is defined by the kettle lid.

The kettle lid also has a water filling flap movably disposed below the water fill inlet, and a closing mechanism that applies a resilient driving force to the water filling flap to allow the water filling flap to close the water fill inlet.

Under the weight of water in the water fill inlet, the water filling flap is configured to move out of sealing engagement with the water fill inlet so as to place the kettle chamber in fluid communication with the ambient environment through the water fill inlet.

In one embodiment of the kettle according to the invention the water filling flap is pivotally connected to a bellows surface of the kettle lid and a locking mechanism is arranged between the kettle lid and the water filling flap return spring.

In one embodiment of the kettle according to the invention, the water filling flap is arranged to slide up and down under the water fill inlet, the closing mechanism being a return spring which drives the water filling flap for movement.

In one embodiment of the kettle according to the invention, the kettle lid has a sealing ring for a sealed connection with the kettle body.

In one embodiment of the kettle according to the invention, a sealing ring is arranged between the water fill inlet and the water filling flap.

In one embodiment of the kettle according to the invention, an annular groove for receiving the sealing ring is defined below the water fill inlet.

In one embodiment of the kettle according to the invention, the water fill inlet has a circular truncated cone with a wider upper portion and a narrower lower portion.

In one embodiment of the kettle according to the invention, the kettle lid is snapped directly onto an upper portion of the kettle body.

In one embodiment of the kettle according to the invention, the kettle lid is pivotally connected to an upper portion of the kettle body.

In one embodiment of the kettle according to the invention, the kettle is an electric kettle.

As is apparent from the above technical solution, the present invention has the following advantageous effects: In use, the present kettle can be placed under a faucet, the faucet can be turned on to allow water to flow into the water fill inlet, the water filling flap will pivot down as the weight of the water increases, whereupon the water fill inlet opened (unsealed) to allow water to flow through the water fill inlet and into the kettle body.

Compared to typical conventional one-handle electric kettles, the present kettle may have a simpler structure, be cheaper and more convenient to use, and allow a user to pour water into the kettle body without having to open the kettle lid by hand.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
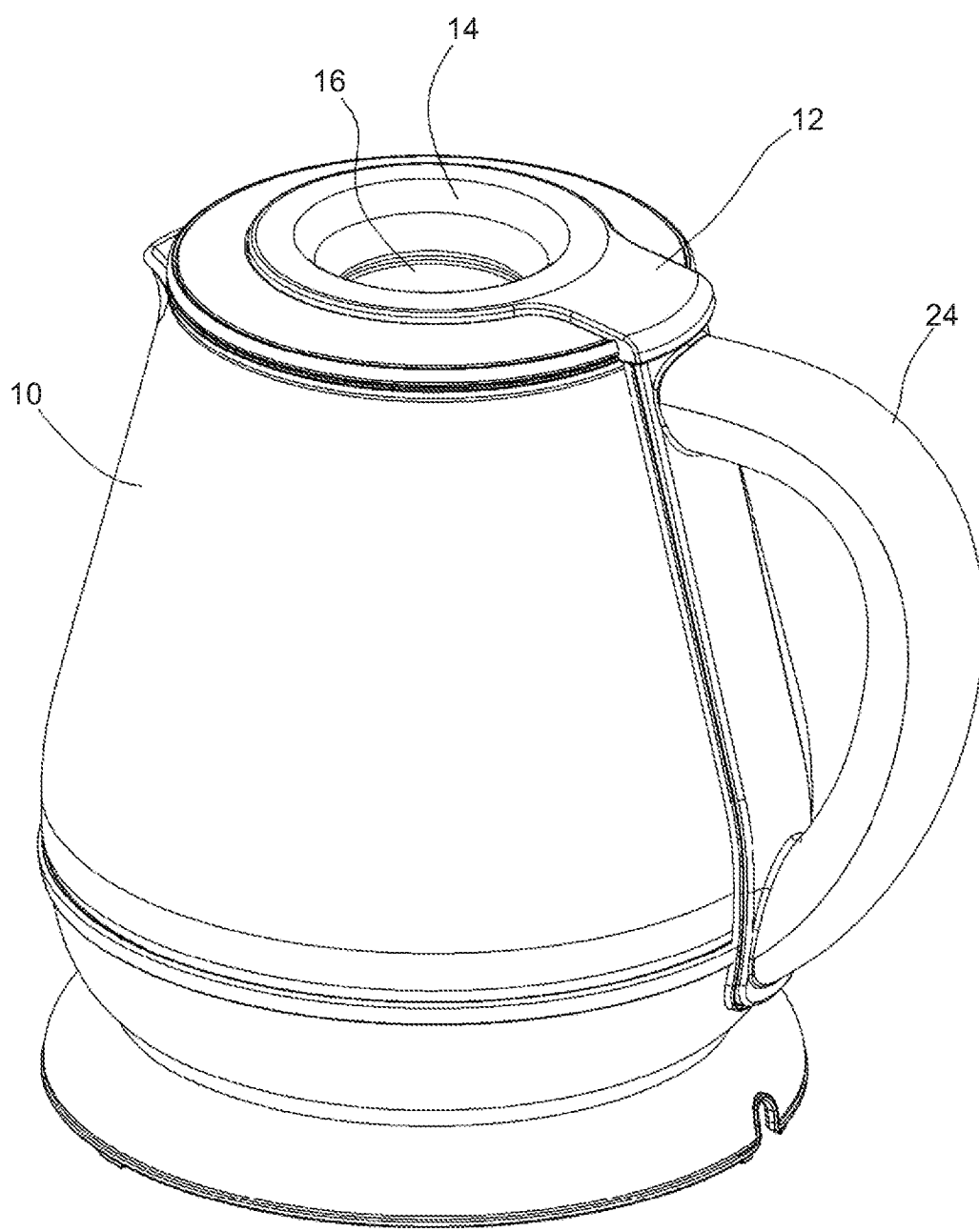
FIG. 1 is a diagrammatic perspective view of an embodiment of the kettle according to the present disclosure.

The reference numerals in the figures designate: a kettle body (10), a kettle lid (12) a water fill inlet (14), a water filling flap (16), return spring (18), an outer sealing ring (20), an inner sealing ring (22), a handle (24), and a shaft journal (26), seal groove (28), kettle chamber (30), ambient environment 32, bellows surface (34), water present in the water fill inlet ($W_i$), water present in the kettle chamber ($W_c$), and weight of water in the water fill inlet ($F_w$).

DETAILED DESCRIPTION OF THE PREFERRED EMBODIMENTS

Referring now to the drawings, like reference numerals designate identical or corresponding features throughout the several views.

Hereinafter, exemplary embodiments showing the features and advantages of the present invention will be described in detail. It should be understood that various changes and modifications can be made to the invention within the scope of the present invention, and the description and drawings are given by way of illustration only and are not intended to limit the present invention.

Figure 2:
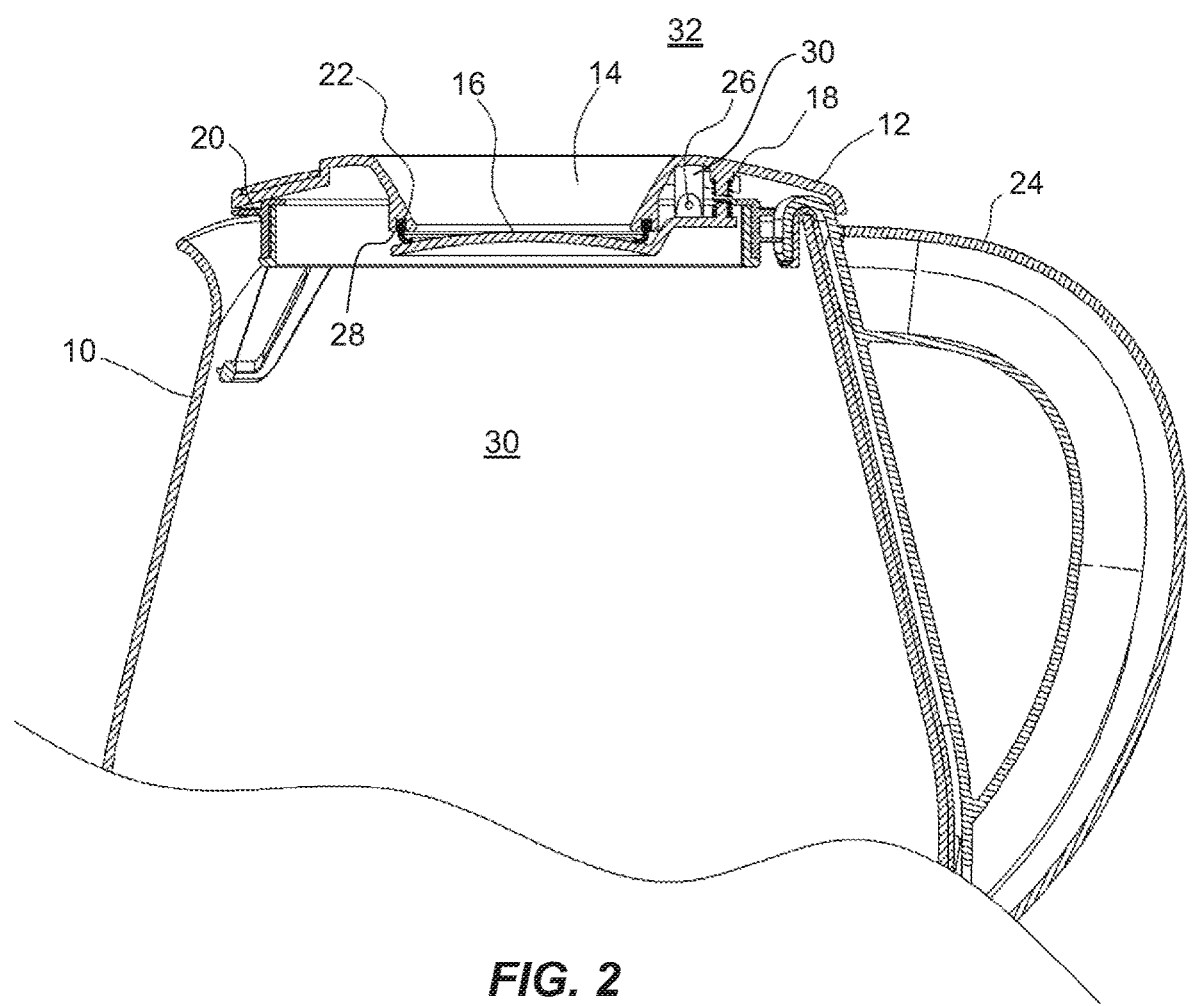
FIG. 2 is a diagrammatic partial cross-sectional view of the kettle of FIG. 1.
Figure 3:
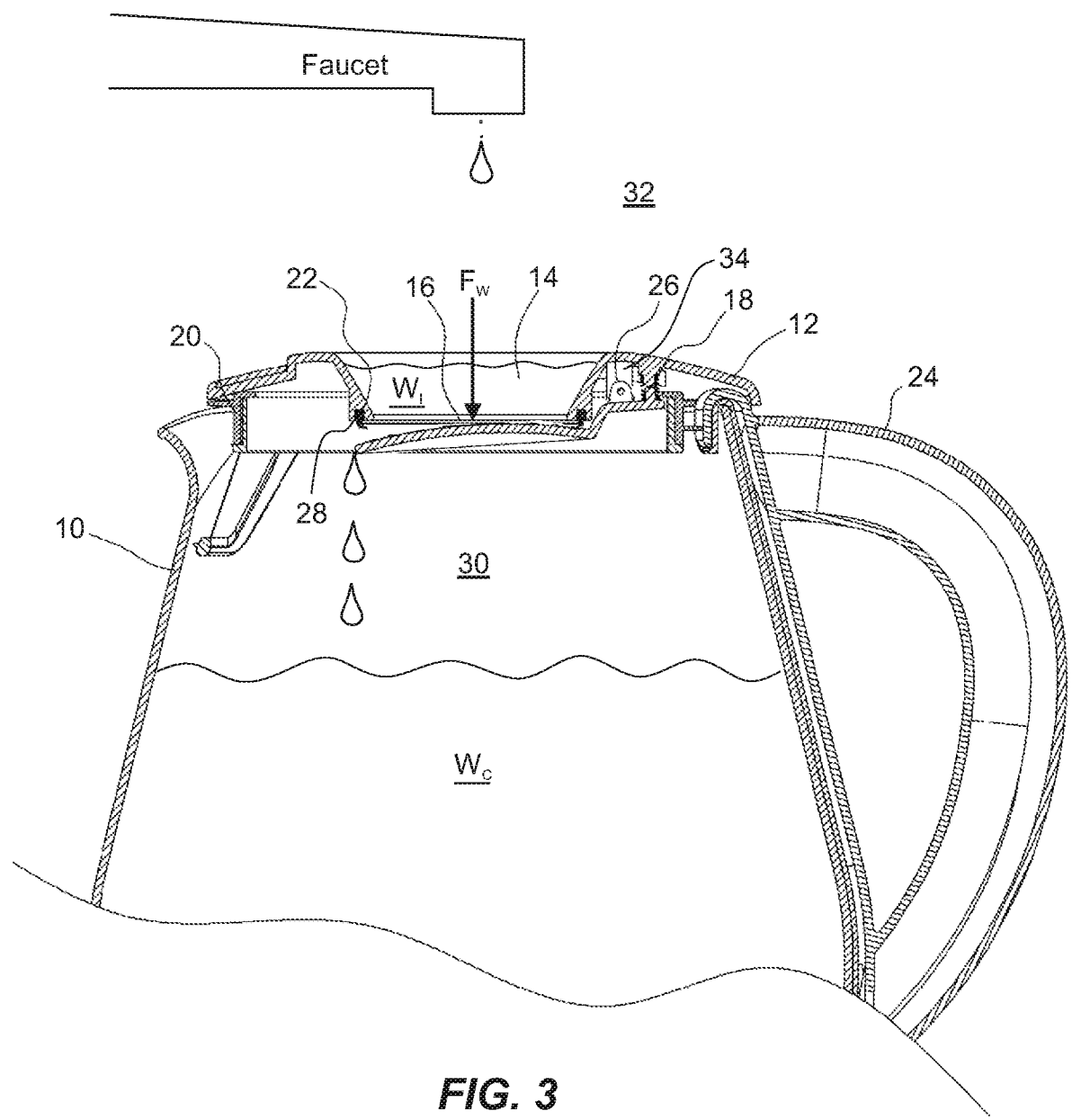
FIG. 3 is a diagrammatic partial cross-sectional view similar to that of FIG. 2, but showing the weight of the water in the water fill inlet being sufficient to force the water filling flap out of its sealing position, thereby allowing the water to flow from the water fill inlet into the kettle chamber.

As shown in FIGS. 1 and 2, according to an embodiment of the present invention, there is provided a kettle having a kettle body 10 and a kettle lid 12. The kettle lid 12 is preferably configured to cover the kettle body 10. The kettle according to the invention may be an electric kettle, without being limited thereto.

By the kettle lid 12 a water fill inlet 14 is defined. The water fill inlet 14 may roughly be a circular hole. As illustrated for example in FIG. 2, in one embodiment, the water fill inlet 14 has the shape of a circular truncated cone with a larger (wider) upper portion and a smaller (narrower) lower portion. The kettle lid 12 may also have a water filling flap 16 and a closing mechanism. The water filling flap 16 is movably disposed below the water fill inlet 14. The closing mechanism may apply a resilient driving force to the water filling flap 16 to allow the water filling flap 16 to sealingly close the water fill inlet 14. When water is to be replenished in the kettle body 10, the kettle may be placed under a faucet so that water flows into the water fill inlet 14. Under the weight of water, the water filling flap 16 is configured to overcome the elastic driving force exerted by the closing mechanism and thereby open the water fill inlet 14 to fluid communication with the inside of the kettle body 10.

The kettle lid 12 may be pivotally connected to an upper portion of the kettle body 10. The kettle lid 12 may have at its outer edge a sealing ring 20 for a sealed connection with the kettle body 10. The kettle lid 12 can be directly engaged on the upper portion of the kettle body 10, and when the kettle lid 12 is detached, the kettle lid 12 and the kettle body 10 are separated from each other.

A sealing ring 22 is preferably arranged between the water fill inlet 14 and the water filling flap 16 in order to improve the sealing effect therebetween. The sealing ring 22 can be arranged (e.g., affixed) on the water fill inlet 14 or on the water filling flap 16. In one embodiment, an annular groove 28 is defined in the bottom of the water inlet 14, in which the sealing ring 22 is received.

In one embodiment, the water filling flap 16 may be pivotably connected to a bellows surface of the kettle lid 12 via a shaft journal 26. The closing mechanism may be a return spring 18 arranged between the kettle lid 12 and the water filling flap 16. The return spring 18 can exert a downward elastic driving force on the end portion of the water filling flap 16, thereby causing the water filling flap 16 to pivot upward and cover the bottom of the water fill inlet 14. The installation forms of the water filling flap 16 are not limited. By way of example, in an alternative embodiment of the present invention, the water filling flap 16 may be slidably disposed below the water fill inlet 14 via a sliding groove from top to bottom so as to allow the water filling flap 16 to move up and down (e.g., axially toward and away from the water inlet 14). In such embodiment, the closing mechanism may be a return spring which is disposed below the water filling flap 16 and configured to drive the water filling flap 16 toward its upward (i.e., sealed) position.

When in use, embodiments of the presently-disclosed kettle may be placed under a water faucet, whereupon the faucet is turned on to allow water to flow into the water fill inlet 14. The water filling flap 16 will be forced to pivot down (i.e., away from its sealed position toward an unsealed position) as the weight of the incoming water $F_w$ increases, so that the water fill inlet 14 will be open (unsealed) to allow water to flow into the kettle body 10. Compared with a conventional, one-handed openable kettle, the presently-disclosed kettle has a simpler structure, costs less, and is more convenient to use, and water can be poured into the kettle body without having to open the kettle lid by hand.

Once insufficient water remains in the water fill inlet 14 to retain the water filling flap 16 in the unsealing position (e.g., upon completion of the filling process), the water filling flap 16 is automatically returned to the sealing position, thereby sealing the kettle chamber 30 from fluid communication with the ambient environment 32 through the water fill inlet 14. This allows the pressurized steam produced within the kettle chamber during the heating of the kettle to be adequately retained therein. Preventing the steam from escaping the kettle ensures that the electric/auto-off component of the kettle is able to function effectively.

It should be understood that the present invention is not limited in its application to the design details and arrangement of components set forth herein. The present invention may have other embodiments and be implemented and carried out in various ways. Within the scope of the present invention, variations and modifications of the above-described embodiments are possible. It should be understood that the present invention described and defined herein encompasses all alternative combinations of two or more of the individual features mentioned or apparent in the text and/or drawings. All of these various combinations form various alternative aspects of the present invention. The embodiments described herein represent the best modes for implementing the present invention and will enable one skilled in the art to utilize the present invention.

What is claimed is:

1. A kettle comprising:
a kettle body and a kettle lid, a kettle chamber defined within the kettle body, an ambient environment defined externally to the kettle body and kettle lid, a water fill inlet defined as extending through the kettle lid from the ambient environment toward the kettle chamber, the kettle lid including a water filling flap and a closure mechanism, the water filling flap being disposed below the water fill inlet and being movable into and out of a sealing position with respect to the water fill inlet, the closure mechanism applying a resilient drive force for biasing the water filling flap toward the sealing position;

wherein
  (a) when the water filling flap is out of the sealing position, the kettle chamber is in fluid communication with the ambient environment through the water fill inlet;
  (b) when the water filling flap is in the sealing position, the kettle chamber sealed from fluid communication with the ambient environment through the water fill inlet;
  (c) the resilient drive force is configured to be overcome by the weight of water statically disposed within the water fill inlet, thereby moving the water filling flap out of the sealing position and toward the unsealing position;
  (d) a sealing ring is disposed between the water fill inlet and the water filling flap; and
  (e) the water fill inlet includes an annular groove defined in the bottom of the water inlet within which the sealing ring is affixed.

\* \* \* \* \*